J. P. RICE.
HEAT DISTRIBUTER.
APPLICATION FILED JAN. 25, 1915. RENEWED AUG. 8, 1916.
1,236,360. Patented Aug. 7, 1917.
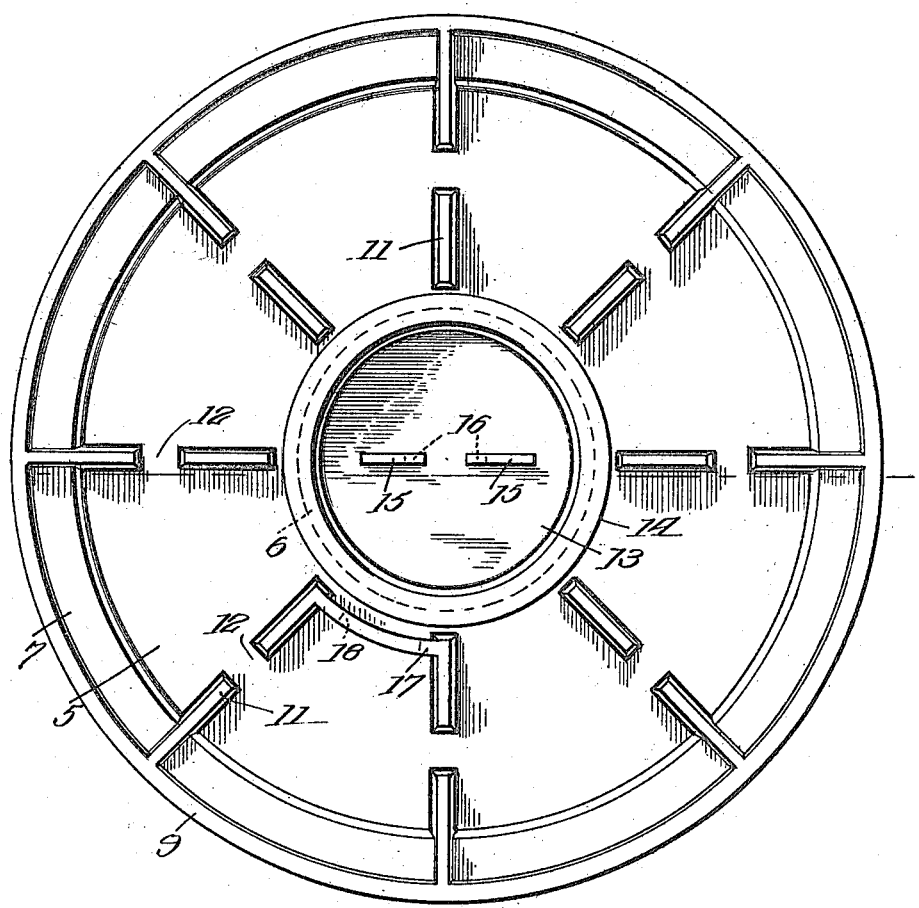
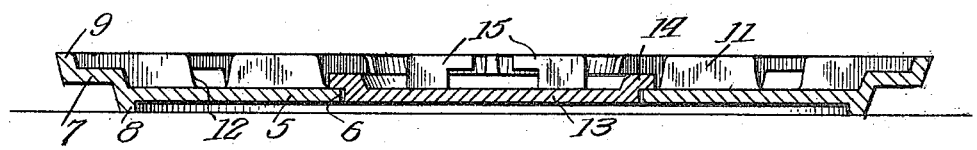
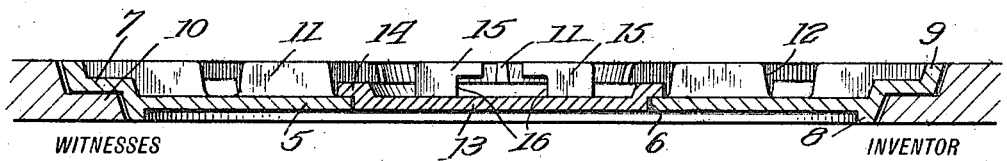

UNITED STATES PATENT OFFICE.

JENNIE PICQUETTE RICE, OF GARBERVILLE, CALIFORNIA, ASSIGNOR TO NORMAN E. RICE, OF GARBERVILLE, CALIFORNIA.

HEAT-DISTRIBUTER.

1,236,360. Specification of Letters Patent. Patented Aug. 7, 1917.

Application filed January 25, 1915, Serial No. 4,211. Renewed August 8, 1916. Serial No. 113,833.

*To all whom it may concern:*

Be it known that I, JENNIE P. RICE, a citizen of the United States, residing at Garberville, in the county of Humboldt and State of California, have invented certain new and useful Improvements in Heat-Distributers, of which the following is a specification.

This invention relates to an improved heat distributing device.

One of the principal objects of the invention is to provide a heat distributing device adapted to be disposed upon the top of a range or to be utilized in connection with a gas burner, or to be used as a lid for a range or similar stove.

Another object of the invention is to provide a heat distributer adapted when placed upon a stove top to form in connection with the stove top and a cooking utensil, a double hot air chamber beneath the utensil in order that the contents of the latter will not be burned during the cooking process.

A further object of the invention is to provide a heat distributer adapted to provide in connection with a stove and a cooking utensil a double hot air space below the utensil, said distributer having a removable portion whereby a single hot air chamber may be provided beneath the utensil when the distributer is placed on top of the stove, and whereby direct heat from the fire box of the stove may be applied to the utensil when the heat distributer is used as a stove lid.

Still another object of the invention is to provide a device of the class described which will be extremely simple, durable, efficient in operation and inexpensive to manufacture.

With these and other objects in view which will become apparent as the description proceeds, the invention resides in the construction, combination and arrangement of parts, hereinafter more fully described and claimed, and illustrated in the accompanying drawing, in which like characters of reference indicate like parts throughout the several figures, of which—

Figure 1 represents a top plan view of a heat distributer constructed according to my invention.

Fig. 2 represents a radial sectional view thereof.

Fig. 3 represents a view similar to Fig. 2 showing the heat distributer as disposed in a lid opening of a stove top.

The distributer includes a circular plate 5 having a central opening at 6 and provided with an upwardly off-set horizontal annular flange 7 along its outer edge. A depending annular flange 8 is provided along the outer edge of plate 5, and acts as means whereby said plate may be supported above a stove top in spaced relation thereto. The off-set horizontal flange 7 is provided with an upwardly extending annular flange 9. The circumferential edges of depending flange 8 and upwardly extending flange 9 may if desired be beveled or cone shaped as shown. The horizontal flange 7 acts as means whereby the heat distributer may be supported in a stove lid opening as indicated in Fig. 3, said flange 7 resting against the projecting shoulder or flange 10 of the stove top.

Extending upwardly from plate 5 and in radial and equally spaced positions thereon, is a plurality of ribs 11. Each rib extends approximately from the central opening 6 to the upwardly extending flange 9, with which it is connected. The upper edges of ribs 11 are preferably flush with the upper edge of flange 9. These ribs intermediate their ends are provided with recesses or cut away portions 12.

A central plate or closure disk 13 having an upwardly off-set annular flange 14 is provided. Disk 13 is adapted to be disposed within central opening 6, and to be maintained in position by the engagement of flange 14 upon plate 5. A pair of short ribs 15 is carried by disk 13, in spaced and alined relation with each other. The inner adjacent edges of these short ribs or lugs below the upper edges thereof are recessed as at 16, so that a lid lifter or other suitable instrument may be engaged with the shorter ribs or lugs for removing disk 13 from the plate.

When the device is placed upon a stove top, a lower hot air chamber is formed below the plate 5 and disk 13, said plate and disk forming the top of the lower hot air chamber, the stove lid forming the bottom thereof and flange 8 forming the walls thereof. A second upper hot air chamber is formed between the plate and disk, and the utensil disposed upon the distributer, said plate and disk forming the bottom of the upper chamber, the utensil forming the top thereof, and flange 9 forming the walls of the upper hot air chamber. In this manner a double hot air chamber is provided between the utensil and stove, so that the utensil is not subjected to the direct heat of the stove and hence the contents of the utensil will not be burned. The recesses or cut-away portions 12 allow circulation of the heat between the compartments formed by adjacent flanges 11, whereby the heat may be evenly distributed beneath the utensil.

The disk 13 may be removed from the plate 5 if so desired and when this is done direct communication between the lower and upper air chambers may be formed so that virtually there will be but one air chamber between the cooking utensil and the stove top. In this manner the utensil will be subjected to a more direct heat, but because of the flange 9 and ribs 11 upon which said utensil rests, and by reason of the even distribution of the heat through the compartments through action of recesses 12 there will be no danger of burning the contents of the utensil, although said contents may be cooked in a shorter time than that consumed when the disk 13 is in place.

The heat distributer may as indicated in Fig. 3 be placed in a stove lid opening, and the disk 13 may or may not be left in place, depending upon whether a direct or indirect heat is desired. If the disk is removed the utensil will be subjected to direct heat from the fire box. In this case the ribs 11 and flange 9 will nevertheless prevent, or at least materially reduce the danger of the contents of the utensil being burned or scorched.

In order to provide means for lifting the plate 5, I may utilize a rib or flange 17 connecting the inner ends of two adjacent ribs 11, and having an opening at 18 below its upper edge for receiving a lid lifter.

The device may be used on a gas stove to advantage. When in such use the closure disk will more advantageously be kept in place to prevent direct contact of the gas flame with the cooking utensil. The heat from the flame will however be equally distributed to all parts of the utensil bottom.

Although I have described the preferred embodiment of my invention, I may desire to make such changes in the construction, combination and arrangement of parts thereof as do not depart from the spirit of the invention and the scope of the appended claims.

I claim:—

1. A device of the class described comprising a plate having a central opening, a horizontally disposed upwardly off-set annular flange provided on said plate, an upwardly extending annular flange provided on last said flange at the outer edge thereof, a depending annular flange provided on said plate, a closure disk having an upwardly offset horizontal flange, said disk adapted to be disposed within said central opening and maintained therein by engagement of last said flange with said plate, radially disposed spaced ribs projecting upwardly from said plate, and provided intermediate their ends with recesses, said ribs extending approximately from said central opening to said upwardly projecting flange, and a pair of ribs provided on said closure disk and having recesses therein, substantially as described.

2. A device of the class described including a plate having a central opening and having an upwardly extending marginal flange, means whereby said plate may be disposed above and in spaced relation to a stove top, a plurality of upwardly projecting ribs provided on said plate and extending substantially from the central opening to the said flange, said ribs provided with recesses extending from the upper edges of the ribs substantially to the plate, and a closure disk removably disposed within said central opening.

JENNIE PICQUETTE RICE.

Witnesses:
MARK W. STONE,
IRA L. TOOHY.

Copies of this patent may be obtained for five cents each, by addressing the "Commissioner of Patents, Washington, D. C."